INVENTORS.
CECIL E. ADAMS
JOHN F. HEDGE
BY
OLSON, TREXLER,
WOLTERS & BUSHNELL

Jan. 14, 1969     C. E. ADAMS ET AL     3,421,413
ROTARY VANE FLUID POWER UNIT

Filed April 18, 1966     Sheet 2 of 7

INVENTORS.
CECIL E. ADAMS
JOHN F. HEDGE
BY
OLSON, TREXLER,
WOLTERS & BUSHNELL

INVENTORS.
CECIL E. ADAMS
JOHN F. HEDGE
BY
OLSON, TREXLER,
WOLTERS & BUSHNELL

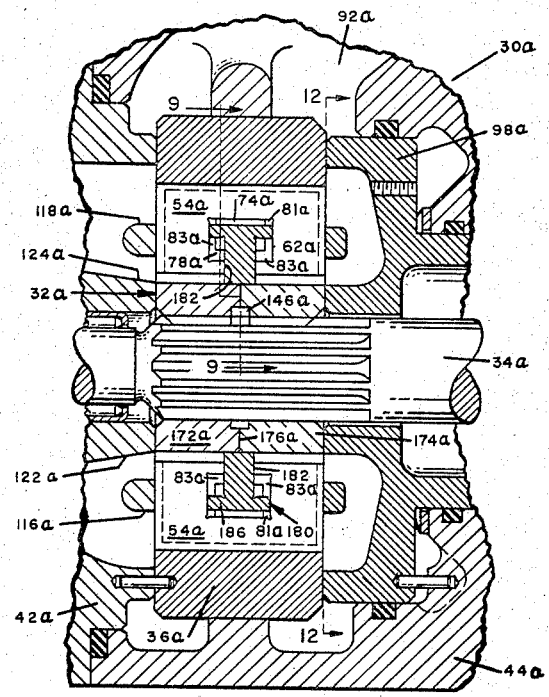
FIG. 8
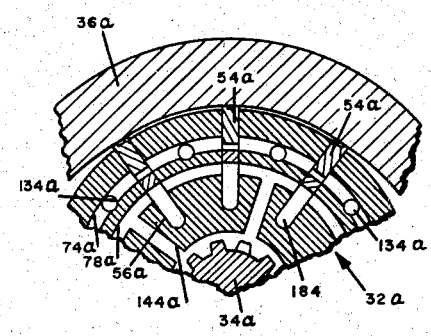
FIG. 9
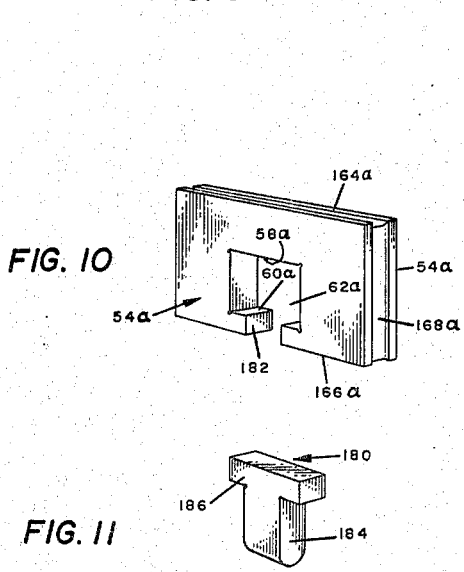
FIG. 10
FIG. 11
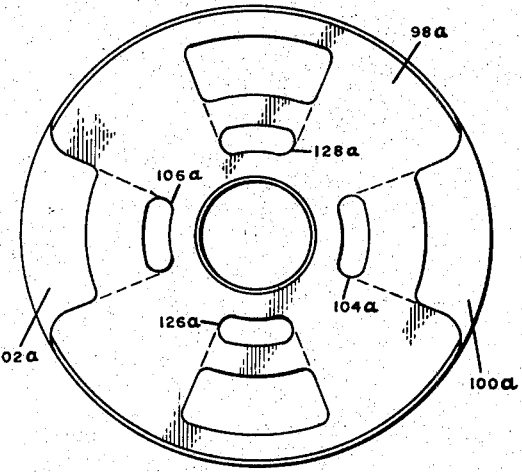
FIG. 12
INVENTORS.
CECIL E. ADAMS
JOHN F. HEDGE
BY
OLSON, TREXLER,
WOLTERS & BUSHNELL

INVENTORS.
CECIL E. ADAMS
JOHN F. HEDGE
BY
OLSON, TREXLER,
WOLTERS & BUSHNELL

3,421,413
ROTARY VANE FLUID POWER UNIT
Cecil E. Adams, Columbus, and John F. Hedge, Worthington, Ohio, assignors to Abex Corporation, New York, N.Y., a corporation of Delaware
Filed Apr. 18, 1966, Ser. No. 543,292
U.S. Cl. 91—135                  16 Claims
Int. Cl. F01c *3/02;* F03c *3/00;* F04c *3/00*

ABSTRACT OF THE DISCLOSURE

A rotary vane fluid power unit in which a plurality of vanes slidably supported in a rotor are individually maintained in optimum engagement with an encircling cam surface by fluid pressure acting radially on four surfaces all formed on the individual vane itself. The inward force of fluid pressure on the surface of the outer edge of each vane is offset continuously by the outward force of a similar fluid pressure on the surface of the inner edge of each vane. A differential outward force of fluid pressure is continuously applied to each vane by high and low fluid pressures applied respectively and continuously to third and fourth surfaces on the vane in such manner that all surfaces which slide in relation to each other, as an incident to radial movement of the vane, support the vane. Moreover, the working structure which moves radially with each vane can be confined to the vane itself with consequent simplification of working parts of the unit and avoidance of costs and service problems otherwise associated with the use of additional working parts.

---

The present invention relates to rotary vane fluid power units intended for application in which high performance capabilities from such units are desirable. As will appear, the invention is concerned more particularly with high performance rotary vane fluid power units in which differential fluid pressure is used continuously to urge each individual vane radially outward into continuous sealing engagement with a coacting cam surface.

During operation of a rotary vane fluid power unit, it is necessary that the individual vanes be maintained in continuous engagement with a coacting cam encircling the rotor which supports and orbits the vanes. Otherwise, the service life of the unit will be grievously shortened and intolerable inefficiencies in operation will ensue.

The matter of maintaining the individual vanes continuously in optimum sealing engagement with the coacting cam has been materially complicated by efforts to increase the performance capabilities in relation to the size of power units of this character. Characteristically, increases in the output capacity of a rotary vane fluid power unit of a given size require corresponding increases in the rotary speed of the vanes, which in turn can severely complicate the problem of holding the individual vanes continuously against the coacting cam, the individual vanes being required to move in and out in their support rotor to follow the cam as the vanes orbit through their endless path.

Structures used in such power units to urge the vanes outwardly against the coacting cam characteristically occupy space sorely needed for accommodation of other essential components of a typical unit. The same considerations in the design of high performance rotary vane fluid power units that require the units to operate at high rotary speeds also place a premium on minimizing the overall size of the units. In achieving the objective of maintaining the vanes in contact with the cam in high speed units by means of structure occupying a minimum of space within the units, it has been found advantageous to use the force of fluid pressure to urge the vanes outwardly into engagement with the coacting cam. In using the force of fluid pressure to perform this function, it becomes necessary to control the degree of the net fluid pressure force which urges each vane outwardly so as to avoid damage to the coacting parts.

The matter of controlling the net outward force of fluid pressure applied to each vane is, itself, severely complicated by the fact that each vane is exposed to large forces of fluid pressure that rapidly change as the individual vane moves through different pressure zones in the unit. The unavoidable rapid changes in the forces of fluid pressure to which a moving vane is subjected can radically effect the net force of fluid pressure urging each vane outwardly against the coacting cam.

Despite the advantages to be gained by urging the vanes against the coacting cam by the forces of fluid pressure, the mere provision of essential control for such fluid forces on the vanes is not enough. To be a practical utility, a rotary vane fluid power unit, first and foremost, must be suited for manufacture at a price that can be justified and it must be capable of operating with the efficiency and dependability demanded in the service in which it is used.

One object of the invention is to provide a rotary vane fluid power unit having a new and improved construction that is practical in design and suited for manufacture on a commercial basis and which provides high performance service capabilities from units of minimized size and compact construction in which each vane is continuously urged into effective sealing contact with the coacting cam by an advantageously controlled net force of fluid pressure, throughout the endless orbital path of the vane.

Another object is to provide an improved rotary vane fluid power unit of the character recited in the preceding object in which the structure operated by fluid pressure to urge each vane outwardly throughout its path by a controlled net force fluid pressure actually serves to strengthen the rotor which supports and orbits the vanes while, at the same time, providing for a highly advantageous minimization of the overall size of the unit.

Another object is to provide an improved rotary vane fluid power unit of the character described in which the forces of fluid pressure on each vane are balanced both radially and laterally except for a net force of fluid pressure continuously applied to the vane in a radially outward direction.

A further object is to provide a rotary vane fluid power unit of the character recited in the preceding objects having an improved construction which affords significant economies in manufacture, provides for easy assembly of component elements of the unit and makes for convenience in service, if that should become necessary.

Other objects and advantages will become apparent from the following description of the exemplary embodiments of the invention illustrated in the drawings, in which:

FIG. 8 is a fragmentary axial sectional view corresponding to the central portion of FIG. 1 but showing a modified unit constructed in accordance with the invention;

FIG. 9 is a fragmentary transverse sectional view of the modified unit of FIG. 8 taken with reference to the line 9—9 of FIG. 8;

FIG. 10 is a perspective view on an enlarged scale of a typical vane incorporated in the unit of FIG. 8;

FIG. 11 is a perspective view on an enlarged scale of a typical partition and reaction member used with each vane of the unit of FIG. 8;

FIG. 12 is an end view of a port plate in the unit of FIG. 8 taken with reference to the line 12—12 of FIG. 8;

Figures 1, 6, 7:
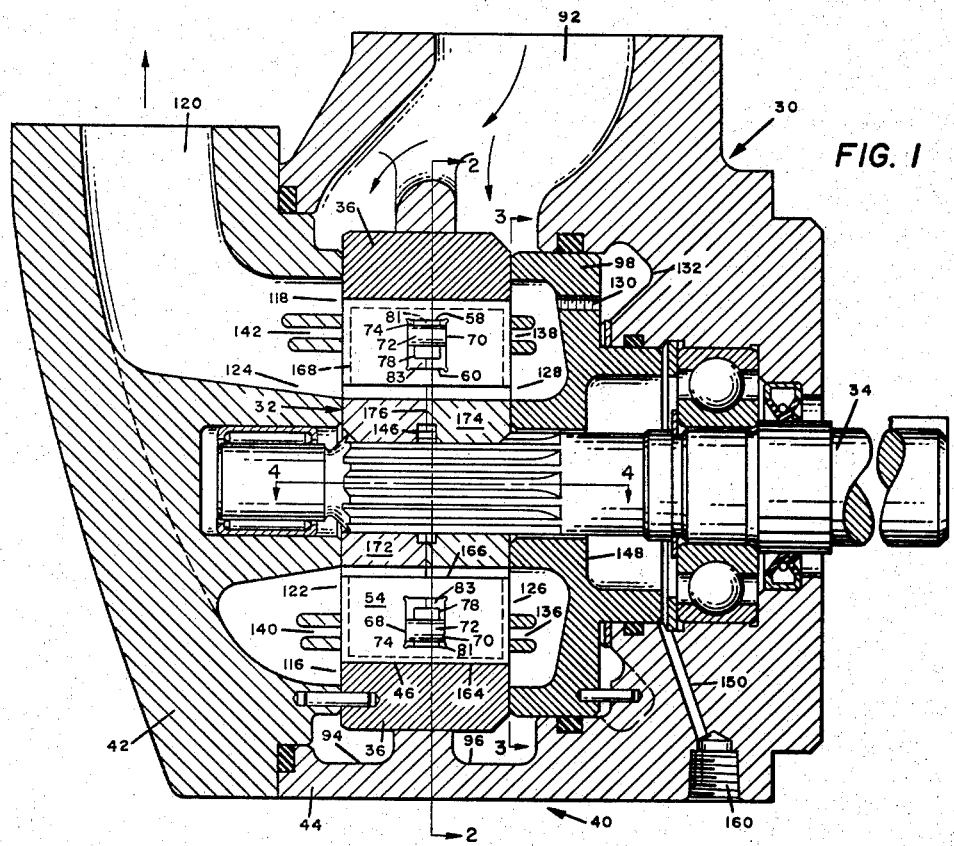
FIGURE 1 is an axial sectional view, taken with reference to the irregular line 1—1 of FIG. 2, of a rotary vane fluid power unit constructed in accordance with the invention; the two main sections of the unit housing, as shown in FIG. 1, being rotated relative to each other somewhat in relation to their normal relative positions for clearness in illustration.
FIG. 6 is a perspective view on an enlarged scale of a typical vane incorporated in the unit of FIGS. 1 to 5.
FIG. 7 is a perspective view on an enlarged scale of a typical partition and reaction member which normally extends through a typical vane of the unit and is locked in the rotor.

Referring to the drawings in greater detail, the rotary vane fluid power unit 30 forming the first embodiment of the invention illustrated in FIGS. 1 to 7 comprises a rotor 32 splined to a rotary support shaft 34 and encircled by an annular cam 36. In the unit 30 shown, the cam 36 is stationary and forms a part of a larger housing 40 having two sections 42, 44 that fit together to encase the cam 36 and rotor 32.

Figure 2:
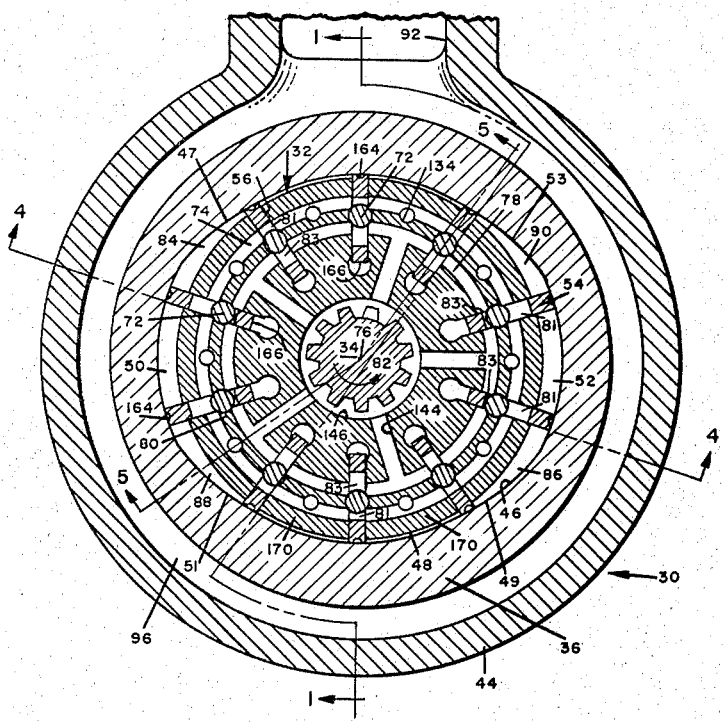
FIG. 2 is a transverse sectional view of the unit taken with reference to the line 2—2 of FIG. 1.

The inner periphery of the cam 36 defines a cam surface 46 which encircles the outer periphery 48 of the rotor 32 and which is shaped in relation to the periphery of the rotor to define between the cam surface 46 and the rotor periphery 48 two transfer spaces 50, 52, FIG. 2, for fluid located generally on diametrically opposite sides of the rotor. Each of the fluid transfer spaces 50, 52 has a substantial arcuate extent along the rotor periphery 48.

The rotary vane unit 30 illustrated is designed to function primarily as a pump and operates upon rotation of the rotor 32 to move fluid through each of the fluid transfer spaces 50, 52 by means of a series of circumferentially spaced vanes 54 supported slidably in a plurality of circumferentially spaced vane slots 56 formed in the rotor 32 to extend radially outward through the periphery 48 of the rotor as shown.

The radially outer edge of each vane 54 defines two spaced sealing edges 55, 57, FIG. 6, extending the axial length of the vane and adapted to slidably engage the cam surface 46 and continuously seal against the cam surface 46 as the vane is orbited in an endless path by turning of the rotor 32. To maintain continuous contact with the cam surface 46, each vane 54 must move radially outward in its vane slot 56 before the vane enters the respective fluid transfer spaces 50, 52 and must move radially inward in its slot 56 after the vane progresses out of the opposite ends of the respective fluid transfer spaces 50, 52. This is characteristic of the vane action occurring in rotary vane fluid power units of this character and is necessitated by the fact that the radial spacing of the cam surface 46 from the periphery 48 of the rotor progressively narrows at each end of each of the fluid transfer spaces 50, 52 from a maximum spacing to a running clearance between the cam surface 46 from the rotor periphery 48 in the cam zones intervening between the fluid transfer spaces 50, 52.

The radial movement of the vanes 54 essential to following of the cam surface 46 by the vanes as they orbit through their endless path necessarily quickens as the rotary speed of the rotor 32 is increased. Because of the physical inertia of the vanes 54 and the necessity for accelerating and decelerating the vanes to produce the essential cyclic radial movement of the vanes, it is necessary to apply substantial radial accelerating and decelerating forces to the vanes as they orbit. These accelerating and decelerating forces, which must be applied to the vanes, increase with the orbital speed of the vanes and can become quite substantial in high performance units in which the rotor is turned very fast to effect circulation of fluid at a high rate through the fluid transfer spaces 50, 52.

It has been learned that the radial forces required to effect the desired radial movements of the vanes can be produced to advantage by the force of differential fluid pressure, the fluid pressures normally available in units of this character being capable of producing the required vane control forces when acting on pressure areas of only moderate size in relation to the size of the vanes.

However, the practical realization of the advantages to be gained from controlling radial movement of the vanes by radial forces produced by differential fluid pressures has been a most persistent and challenging problem.

The individual vanes 54 are accelerated in an outward direction to hold the vanes against the cam surface 46 as the vanes travel over the ramps 47 and 49 at the intake zones 84 and 86 respectively and are decelerated to prevent them from separating from the cam surface 46 as they travel over and leave the ramps 51 and 53 at the outlet zones 88 and 90 respectively by the outward differential force of relatively high and relatively low fluid pressures applied continuously and respectively to a high pressure biasing surface or area 58 and a low pressure biasing surface or area 60, FIGS. 1, 2, 4 and 6, formed on each vane and isolated from the external edges of the vane as will presently appear. The differential biasing force of fluid pressure thus applied continuously to each vane in an outward direction is continuously effective throughout the orbital path of each vane to produce the desired vane accelerating and decelerating functions.

In the construction illustrated in FIGS. 1, 2, 4 and 6, the biasing pressure surfaces or areas 58, 60 on each vane 54 are formed respectively by the radially outer and radially inner edges (also denoted by the numbers 58, 60) of a central aperture denoted generally by the number 62 in FIG. 6 formed in the vane and having two parallel radial edges 64, 66 designed to fit slidably against and form an effective seal with the flat opposite ends 68, 70 of a cylindrical partition and reaction member 72 received within the aperture 62 in a manner to be described.

A relatively high fluid pressure is continuously applied to the high pressure vane biasing surfaces or areas 58 of all the vanes 54 by fluid under a relatively high pressure in an annular chamber 74 formed in the rotor 32 between opposite ends of the rotor and extending through all the central vane apertures 62 radially inward of the outer periphery 48 of the rotor as shown in FIGS. 1, 2, 4 and 5. The high fluid pressure chamber 74 is concentric with the axis 76, FIG. 2, of the rotor 32.

In a somewhat similar manner, a relatively low fluid pressure, in relation to the fluid pressure applied to the high pressure vane biasing surfaces 58, is continuously applied to the low pressure vane biasing surfaces 60 of all the vanes 54. The relatively low fluid pressure is applied to the low pressure biasing surfaces 60 by fluid under a relatively low pressure in an annular chamber 78, FIGS. 1, 2, 4 and 5, concentric with the high pressure chamber 74 and formed in the rotor 32 between opposite ends of the rotor radially inward of the high pressure chamber 74 as shown, the low pressure chamber 78 extending through the inner portions of the central apertures 62 in all the vanes 54.

As indicated, both the high pressure chamber 74 and the low pressure chamber 78, which is encircled by the high pressure chamber 74, extend through the central apertures 62 of all the vanes 54. Within the aperture 62 of each vane 54, the high and low pressure chambers 74, 78 are isolated from communication with each other by the previously mentioned partition and reaction member 72. Cylindrical in shape, each partition and reaction member 72 has a diameter which substantially exceeds the thickness of the corresponding vane 54. As shown in the drawings, each partition and reaction member 72 is disposed medially within the corresponding vane aperture 62 so that the partition and reaction member 72 protrudes somewhat laterally beyond opposite sides of the vane and is parallel to the rotor axis 76.

Portions of each partition and reaction member 72 protruding from opposite sides of the associated vane 54 fit firmly in a pair of opposed seats 80 formed in the rotor 32 on opposite sides of the associated vane slot 56, as shown in FIG. 2. The seats 80 have a segmental spherical shape and size conforming to the cylindrical shape and size of the interfitting partition and reaction member 72 so that an effectively fluid-tight seal is formed between each partition and reaction member 72 and the portions of the rotor receiving the portions of the partition and reaction member 72 which protrude from opposite sides of the associated vane 54. As previously indicated, the two flat ends 68, 70 of each partition and reaction member 72 fit slidably against the two internal radial surfaces 64, 66 of the adjacent vane to form an effective fluid-tight seal between the partition and reaction member 72 and the vane at the opposite axial ends of the central aperture 62.

The partition and reaction members 72 are located radially between the high pressure fluid chamber 74 and the low pressure fluid chamber 78 which extend circumferentially through the central aperture 62 of the respective vanes 54. Thus positioned, the partition and reaction members 72 effectively block the passage of fluid through the vanes 54 between the concentric fluid chambers 74, 78 extending through the vanes. This blockage of fluid flow is effected by the fluid sealing relationship of each partition and reaction member 72 to the rotor 32 on opposite sides of the adjacent vane slot and by the slidable seals existing between opposite ends of the partition and reaction member and the adjacent internal radial edges or surfaces 64, 66 on the corresponding vane. It will be observed with reference to FIGS. 1, 2 and 4 that the portion of the annular high pressure fluid chamber 74 extending through the aperture 62 in each vane 54 between the adjacent partition member 72 and the high pressure biasing surface 58 on the vane constitutes a high pressure cavity 81 defined in part by the high pressure biasing surface 58 on the vane and extending radially inward from the high pressure biasing surface to the partition member so that the high pressure cavity is contracted and expanded as an incident to movements of the vane in radially inward and radially outward directions respectively. Similarly, the portion of the annular low pressure fluid chamber 78 extending through the aperture 62 in each vane 54 between the corresponding partition member 72 and the low pressure biasing surface 60 on the vane constitutes a low pressure cavity 83 defined in part by the low pressure biasing surface 60 on the vane and extending radially outward from the low pressure biasing surface to the partition member so that the low pressure cavity is expanded and contracted as an incident to movements of the vane in radially inward and radially outward directions respectively. It will be appreciated that the vanes 54 and the structure of the rotor 32 including the partition members 72 isolate the high pressure cavities 81 from the low pressure cavities 83 and isolate both the high pressure cavities 81 and the low pressure cavities 83 from radially outer ends of the vanes and from the radially inner ends of the vanes so that the fluid pressure in the high pressure cavities 81 and the fluid pressure in the low pressure cavities 83 can be controlled independently of each other and independently of the fluctuating fluid pressures on the radially outer and radially inner ends of the individual vanes.

Figure 4:
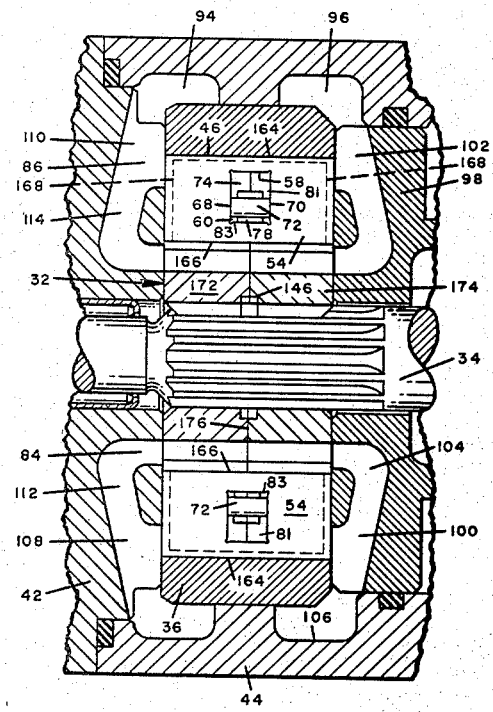
FIG. 4 is a fragmentary axial sectional view taken with reference to the line 4—4 of FIG. 2 and illustrating structure disposed in the fluid inlet zones in the unit.

Having reference again to the drawings, FIGS. 1, 4 and 6, it will be observed that the high pressure biasing surface 58 and the low pressure biasing surface 60 on each vane are both located radially between the radially outward edge 164 and the radially inward edge 166 of the vane.

The manner in which fluid under a relatively high pressure acting on the internal surface 58 and fluid under a relatively low pressure acting on the internal surface 60 of each vane serves to continuously apply a radially outward differential force of fluid pressure to each vane will be described hereinafter.

Operation of the unit 30 is accompanied by a continuous circulation of fluid through each of the fluid transfer spaces 50, 52 with the fluid normally undergoing a distinct change in pressure in passing through the respective fluid transfer spaces.

The unit 30 illustrated is designed to function primarily as a pump, the rotor 32 being driven normally in a counterclockwise direction as indicated by the arrow 82 in FIG. 2. Having reference again to FIG. 2, fluid under a relatively low pressure, specifically the suction pressure of the unit, is admitted to the respective fluid transfer spaces 50, 52 at intake zones 84, 86 appearing at the leading or clockwise ends of the respective spaces 50, 52. In passing through the spaces 50, 52, the fluid being pumped is pressurized and passes from the opposite or trailing ends of the spaces 50, 52 in outlet zones 88, 90.

Intake fluid is fed to the intake zones 84, 86 through intake passages in the housing 40. More particularly, the housing section 44 defines a suction or intake passage 92, FIG. 1, adapted for connection with a suitable source of fluid and communicating directly with two annular fluid supply passages 94, 96 encircling opposite ends of the cam 36, FIGS. 1, 2 and 4.

The right hand end of the rotor 32 and the adjacent end of the annular cam 36, with reference to FIG. 1, are confronted by an axially movable cheek or port plate 98 mounted in the housing section 44 and urged toward the rotor by fluid pressure, as will be described hereinafter.

Figure 3:
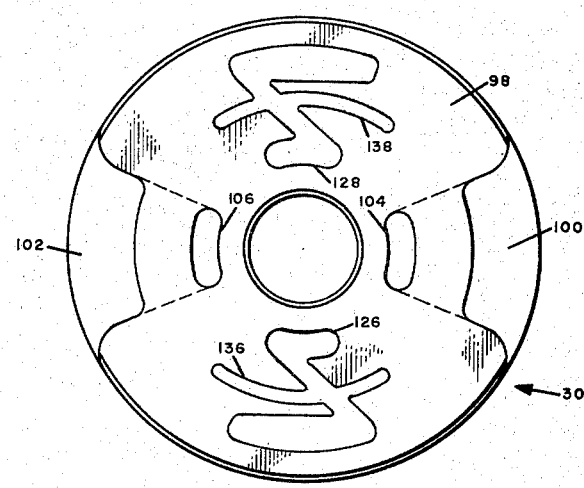
FIG. 3 is an axial end view of a port plate in the unit taken with reference to the line 3—3 of FIG. 1.

As shown in FIGS. 3 and 4, the port plate 98 is shaped to form intake ports 100, 102 which channel intake fluid from the adjacent annular passage 96 into the fluid transfer spaces 50, 52 through the respective intake zones 84, 86. Inner extensions 104, 106 of the intake ports 100, 102 feed intake fluid into the adjacent ends of the vane slots 56 carrying vanes through the intake zones 84, 86, the intake ports 100, 102 being located radially, as shown in FIGS. 3 and 4, to feed fluid into the vane slots radially inward of the vanes 54 as the vanes move outwardly in the inlet ends of the fluid transfer spaces 50, 52 to effect filling of the vane slots with fluid inwardly of the inner edges of the outwardly moving vanes.

The housing section 42 confronts the adjacent ends of the rotor 32 and cam 36 opposite from the movable port plate 98 and defines intake porting 108, 110 and intake porting extensions 112, 114, FIG. 4, shaped substantially as mirror images of the intake porting 100, 102 and the intake porting extensions 104, 106 of the port plate 98 and serving to connect the annular fluid supply passage 94 with the intake ends of the fluid transfer passages 50, 52 and with the inner portions of the slots 56 carrying vanes through the intake zones 84, 86.

In the outlet zones 88, 90 of the fluid transfer spaces 50, 52, fluid is discharged from the spaces 50, 52 through outlet ports 116, 118 formed in the housing section 42 and joining with a common fluid outlet 120 as indicated in FIG. 1. It should be noted that in order to better reveal the outlet ports 116, 118, the housing section 42, as illustrated in FIG. 1, is rotated somewhat from the position it normally occupies in relation to the housing section 44. In practice the outlet ports 116, 118 register in a circumferential direction with the outlet zones 88, 90 previously mentioned. Inner outlet ports 122, 124 also formed in the housing section 42 and communicating with a common outlet 120 register with the inner ends of the rotor slots 56 in the outlet zones 88, 90 to receive fluid displaced from the slots by the inwardly moving vanes 54.

Figure 5:
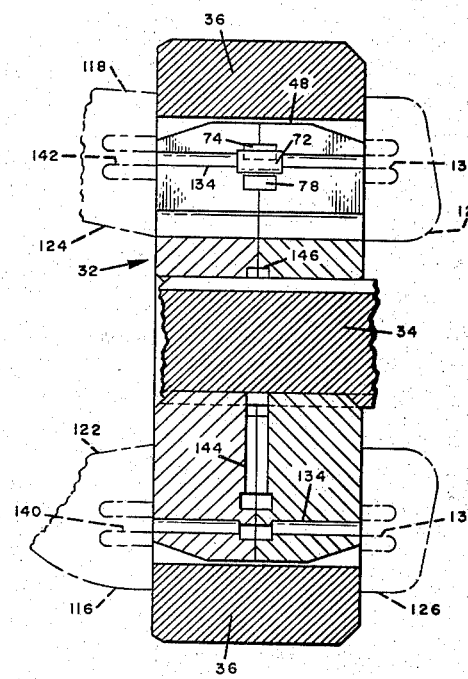
FIG. 5 is a fragmentary axial sectional view taken with reference to the line 5—5 in FIG. 2 with the vane which would normally appear in FIG. 5 eliminated for clearness in illustration.

Outlet porting 126, 128 formed in the movable port plate 98, as shown in FIGS. 1, 3 and 5, and registering circumferentially with the outlet zones 88, 90 connect the inner portions of the passing vane slots 56 with the outlet ends of the fluid transfer spaces 50, 52 to permit fluid displaced from the slots by the inwardly moving vanes to flow through the outlet ends of the fluid transfer spaces into the outlet ports 116, 118. It may be noted that fluid under the high outlet pressure of the pump flows from the porting 128 through a connecting passage 130 into an annular pressure chamber 132, FIG. 1, to urge the port plate 98 toward the rotor 32.

Fluid under the high outlet pressure of the pump is continuously supplied to the annular pressure chamber 74 within the rotor 32. This is effected by means of a plurality of small axial fluid pressure feeding bores 134 extending axially through the rotor 32 in intersecting relation to the high pressure vane actuating chamber 74, as shown in FIGS. 2 and 5. Opposite ends of the fluid pressure feeding bores 134 are fed with fluid under high pressure by two arcuate ports 136, 138 formed in the port plate 98 as extensions of the outlet porting 126, 128, as shown in FIGS. 1, 3 and 5.

The arcuate bore feeding ports 136, 138 are opposed on the opposite side of the rotor 32 by fluid supplying ports 140, 142, FIGS. 1, 3 and 5, having an arcuate shape conforming to that of the ports 136, 138 and registering with the opposite ends of the pressure supply bores 134. The pressure supply ports 140, 142 connect, as shown, with the outlet ports 116, 118 so that a continuous supply of fluid under high pressure to the internal rotor chamber 74 from opposite sides of the rotor 32 is assured.

The relatively low pressure annular chamber 78 in the rotor 32 is continuously connected in this instance to a drainage outlet which may, for instance, lead to an external reservoir (not shown) or back to the inlet passage 92. As shown in FIG. 2, a plurality of low pressure bores 144 extend radially inward through the rotor 32 from the low pressure chamber 78 to an annular groove 146 formed in the inner periphery of the rotor.

From the groove 146, low pressure fluid passes along the support shaft 34 in the construction illustrated to a low pressure plenum space 148 connected through a bore 150 to a suitable fluid outlet 160, FIG. 1. Passage of fluid from the bore 150 axially along the shaft 34 can be facilitated by wholly or partially cutting away one of the support shaft splines 162 as indicated in FIG. 2.

Except for the differential force resulting from fluid under different pressures acting on the opposed internal pressure areas 58, 60 of each vane 54, all the forces of fluid pressure acting on each vane are substantially balanced continuously throughout the circular path of movement of the vane. This is achieved by means providing continuous fluid communication between the radially outer edge 164 of each vane confronting the cam 46 and the radially inner edge 166 of each vane, FIGS. 1, 2, 4 and 6. Communication is provided at all times between the outer and inner edges 164, 166 by pressure equalizing passages or grooves 168 formed in opposite ends of each vane and extending between the inner edge 166 of the vane and the outer edge 164 of the vane between the spaced cam engaging edges 55, 57 on the vane as indicated in FIGS. 1, 4 and 6. As each vane 54 orbits through its path of movement, incipient differences in the fluid pressures on the radially inner edge 166 and the radially outer edge 164 of the vane are reduced by the passage of fluid through the pressure equalizing passages 168 in the vane. As each vane is passing through those portions of its orbital path in which it is moved radially, its inner and outer edges are connected by additional free flowing routes of fluid communication which include in the inlet zones 84, 86 the previously mentioned inlet port extensions 104, 106, 112 and 114; and in the outlet zones 88, 90, the previously mentioned porting 126, 128 and the interconnected ports 116, 118, 122 and 124.

For present purposes, it may be assumed that the fluid pressure acting on all the external edges of each vane, that is, the radially outer and radially inner edges 164, 166 and the opposite ends of the vane, is equal at all times and that the forces of this fluid pressure acting on the four external edges of the vane effectively neutralize each other throughout the orbital path of the vane.

At the same time, each vane is continuously urged in a radially outward direction by the differential force of fluid under a relatively high pressure, in this instance the output pressure of the pump, acting on the radially outward internal pressure surface 58 of the vane and fluid under a much lower pressure acting on the radially inward internal pressure surface 60 of each vane, the opposed internal pressure surface 58, 60 being mutually equal in area.

The continuously effective outward force applied to each vane 54, in the manner described, serves a multiplicity of advantageous functions in maintaining optimum engagement of the respective vanes with the cam surface 46. Among other functions, this continuous outward force produced by fluid pressure and applied to each vane serves to accelerate the vane in an outward direction as it moves across the cam ramp 47 or 49 into one of the fluid transfer spaces 50 or 52 and serves to decelerate the vane and maintain it in engagement with the cam surface 46 as the vane leaves each cam ramp 51 and 53.

Moreover, the degree or value of the differential force of fluid pressure applied continuously to each vane 54 in the manner described can be controlled through design of the unit so that it is adequate to serve well the functions for which it is intended but not excessive so as to produce undue wear on the parts. In general, the degree of differential outward force applied by fluid pressure to each vane 54 can be controlled through the design of the unit by varying the size of the internal differential pressure areas 58, 60.

Because of the high pressures normally available in high pressure units of this character, the required differential outward force of fluid pressure on the vanes can be produced by internal pressure areas 58, 60 of only moderate size on each vane with the concompetent necessity of using partition and reaction members 72 of only small size.

It is particularly noteworthy that the members 72 which serve to separate the high and low pressure chambers 74, 78 and sustain inward forces of fluid pressure corresponding generally to the outward forces of fluid pressure applied to the internal vane surfaces 58 also serve to advantage in effecting a mutual reinforcement of the radially projecting rotor sectors 170 intervening between the vane slots 56. In a high pressure unit, the vanes 54 apply to the intervening rotor sectors 170 bending moments which tend to cause the intervening sectors to deflect in bending, the sectors 170 being essentially structural cantilevers which narrow progressively toward their inner ends where the applied bending moments are the greatest. The bending moments which each vane 54 applies to the adjacent rotor sectors 170 vary as the vane progresses through different zones of its orbital path of motion.

The partition and reaction members 72 intervening between the adjacent rotor sectors 170 are capable of transmitting forces in compression between adjacent rotor sectors 170 with the result that all of the rotor sectors 170 function together to mutually reinforce each other against the bending loads applied by the vanes. Consequently, the rotor sectors subjected to the greatest load receive support from rotor sectors more lightly loaded with the result that stress on the rotor structure is minimized and minimization of the size of the unit can be effected wtihout sacrificing service life or reliability of performance.

The rotor 32 is formed initially in two half sections 172, 174 fashioned generally as mirror images of each other and designed to fit together in mutually confronting concentric relation to each other to form the completed rotor. The mutually confronting faces of the two rotor sections 172, 174 are represented by the line 176 in FIGS. 1 and 4.

The assembled rotor sections 172, 174 are suitably secured in face-to-face relation as by brazing, and the vanes 54 and reaction members 72 are fitted into the slots 56 through one side of the rotor.

The unit 30a illustrated in FIGS. 8 to 11 is a modified embodiment of the invention. Component elements of the unit 30a, which are similar to components of the unit 30 previously described, are identified with the same reference numbers with the addition of the suffix a.

The principal structural modification incorporated in the unit 30a as compared with the unit 30 described is the replacement of the partition and reaction members 72 of the unit 30 with T-shaped partition and reaction members 180 in the unit 30a and modification of the vanes 54a to accommodate and coact with the T-shaped reaction members 180 corresponding to the respective vanes 54a.

As shown in FIGS. 8 and 10, an axially centered radial slot 182 is cut through the inner portion of each vane 54a from the inner external vane edge 166a into the central vane aperture 62a. The inner slot 182 on each vane 54a is dimensioned to closely receive the rectangular reaction column 184 of the associated T-shaped reaction member 180. Each partition and reaction member 180 fits into its associated vane 54a as shown in FIG. 8, so that the reaction column 184 of the member 180 extends radially inward through the vane slot 182 and fits against the bottom of the corresponding vane slot 56a. The inner extremities or bottoms of the vane slot 56a are rounded, as shown in FIG. 9, to avoid stress concentrations and the inner ends of the reaction members 184 are similarly rounded to fit against the bottoms of the vane slots.

The inner portions of each vane 54a, defining opposite sides of the vane slot 182, form slidable, fluid sealing, fits with adjacent sides of the reaction column 184 of the corresponding partition and reaction member 180 to produce effective seals against the flow of fluid along the reaction column 184 between the inner external edge 166a of the vane and the adjacent portion of the low pressure annular chamber 78a.

A partition element 186 extending axially in opposite directions from the outer end of the reaction column 184 of each member 180 is located radially between adjacent portions of the high and low pressure annular fluid chambers 74a, 78a and fits slidably in the associated vane aperture 62a to effectively block fluid communication between adjacent portions of the high and low pressure chambers 74a, 78a.

It should be observed with reference to FIGS. 8 and 10 that the slot 182 in the inner portion of each vane 54a has an axial width materially less than the axial width of the central aperture 62a in the vane so that there are formed on opposite sides of the vane slot 182 two low pressure biasing surfaces or areas 60a which are subjected to only the low pressure of the low pressure fluid in the inner annular chamber 78a. Viewed another way, the vane 54a can be regarded as having a low pressure biasing surface 60a formed in two parts located on opposite sides of the reaction column 184 of the partition and reaction member 180.

The inward force of low pressure fluid on the low pressure biasing surfaces 60a is materially less than the outward force of high pressure fluid on corresponding portions of the high pressure biasing surface 58a with the result that each vane 54a is continuously urged outwardly by the differential force of fluid pressure on the vane.

The unit 30b illustrated in FIGS. 13 to 18 is a modified embodiment of the invention. Component elements of the unit 30b, which are similar to components of the unit 30 previously described, are identified with the same reference numbers with the addition of the suffix b. As will presently appear, the unit 30b is specifically designed to function either as a fluid pump or fluid motor and can function effectively with fluid circulating in either of the two possible directions through the unit.

Figure 14:
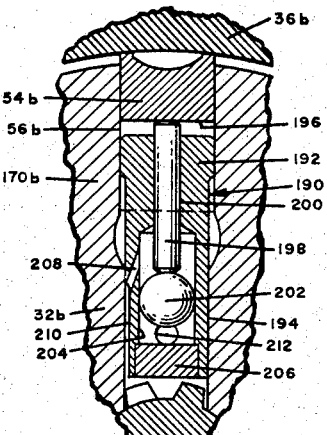
FIG. 14 is a fragmentary sectional view on an enlarged scale taken with reference to the line 14—14 of FIG. 13.

Each vane 54b of the unit 30b is continuously urged outwardly by a differential force of fluid pressure produced and applied to the vane by a fluid energized vane actuating assembly 190 provided for each vane and incorporated into the unit in such manner that the vane actuating assemblies 190 effect a mutual reinforcement of the rotor sectors 170b intervening between the vanes, FIG. 14.

Figure 13:
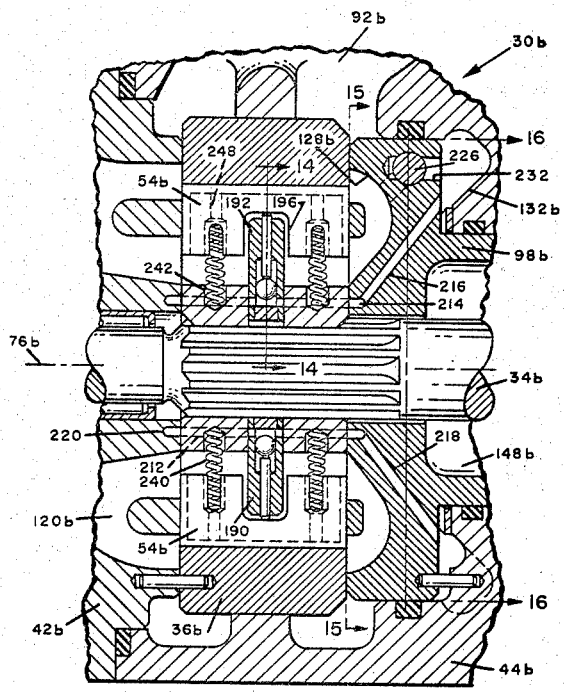
FIG. 13 is a fragmentary axial sectional view corresponding to the central portion of FIG. 1 but showing another modified unit constructed in accordance with the invention.

Each fluid energized, vane actuating assembly 190 comprises a rotor reinforcing plug 192 of elongated, generally cylindrical shape. The inner end of each plug 192 is fitted deeply and firmly into a radial bore 194 extended into the rotor 32b from the bottom of the coacting vane slot 56b, as shown in FIG. 14. Each plug 192 is generally parallel to the associated vane 54b and extends radially outward into an inwardly opening medial notch 196 formed in the coacting vane 54b as shown in FIG. 13. The outer end of each plug 192 is flatted on opposite sides and fits firmly against the adjacent sidewalls of the coacting vane slot 56b to effect the mutual reinforcement of the rotor sectors 170b intervening between the vane slots.

Outward force is continuously applied to each vane 54b by a radially movable cylindrical plunger 198 fitting slidably in a radial bore 200 in the corresponding plug 192 and extending through the outer end of the plug into engagement with the backside of the vane at the bottom of the medial notch 196, as shown in FIGS. 13 and 14.

The force-transmitting plunger 198 of each vane actuating assembly 190 is continuously urged outwardly by the force of differential fluid pressure on a radially movable piston element formed by a ball 202 engaging the inner end of the plunger 198 and having a fluid sealing slidable fit in a counterbore 204 formed in the inner end of the rotor reinforcing plug or cylinder element 192. The counterbore 204 is closed at its inner end by a filler plug 206, FIG. 14.

Figures 17, 18:
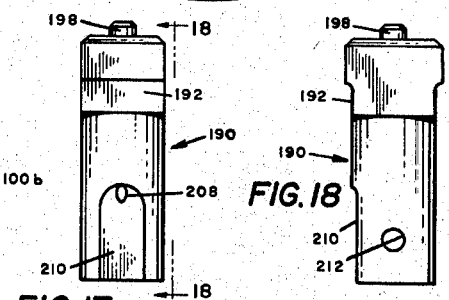
FIG. 17 is a side view on an enlarged scale of a typical vane actuating and rotor support assembly used in the unit of FIG. 13 with each of the vanes.
FIG. 18 is another side view of the assembly of FIG. 17 taken with reference to the line 18—18 of FIG. 17.

The space in each counterbore 204 on the radially outward side of the corresponding ball 202 is continuously connected to drain through an oblique drainage bore 208 extending, as shown in FIGS. 14 and 17, outwardly through the sidewall of the plug 192 from the radially outward end of the counterbore 204 to an external flat 210 on the inner end of the plug 192, which flat allows fluid from the drainage bore 208 to flow inwardly through the rotor bore 194 to the inner periphery of the rotor where the fluid escapes along the support shaft 34b as in the case of the unit 30.

Fluid under high pressure is supplied to the counterbore 204 of all the vane actuating units 190 inwardly of the balls 202. For this purpose, the rotor 32b is pierced by a plurality of fluid supply bores 212 extending between opposite ends of the rotor in a somewhat askew relation to the rotor axis 76b. The fluid supply bores 212 extend through the rotary reinforcing plugs 192 of the respective vane actuating units 190 at radial positions between the balls 202 and the closure plugs 206 so that the fluid supply bores 212 communicate with the respective counterbores 204 inwardly of the balls 202.

Figure 15:
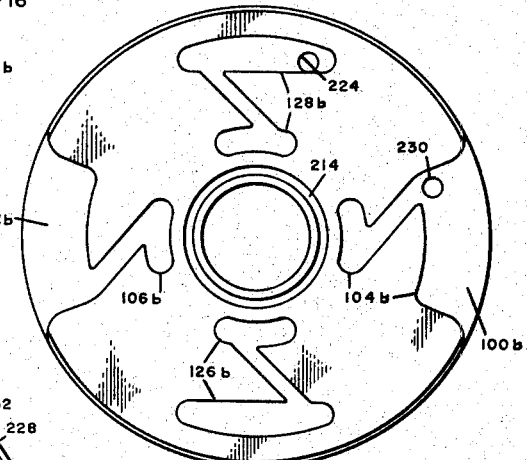
FIG. 15 is a transverse sectional view taken with reference to the line 15—15 of FIG. 13 and showing the rotor confronting face of the port plate.

The ends of all the fluid supply bores 212 confronting the port plate 98b, FIGS. 13 and 15, register radially and communicate continuously with a circular fluid supply groove 214 formed in the rotor confronting face of the port plate 98b. The groove 214 is connected by oblique bores 216, 218, FIG. 13, with the high pressure fluid chamber 132b, which chamber 132b is continuously supplied with fluid under high pressure in a manner to be described.

The ends of the rotor bores 212 opposite from the port plate 98b register radially and connect continuously with an annular high pressure fluid circulating groove 220 formed in the rotor confronting face of the housing section 42b so that fluid can flow through the groove 220 between the several bores 212 as the various balls 202 move in and out with the vanes 54b.

As previously mentioned, the unit 30b is adapted to function as either a pump or motor and the unit can operate with the rotor 32b turning in either direction. To operate the unit as a motor, for example, operating fluid under high pressure can be supplied to the unit from the external environment through either of the main connecting passages 92b or 120b with the fluid being exhausted from the motor through the other of the two passages just mentioned. Similarly, when the unit is operated as a pump, intake or suction fluid can enter the unit through either of the passages 92b or 120b whereupon the fluid is discharged through the other of the two passages. Normally, the passage 92b is used as the intake or suction passage when the unit is operated as a pump.

The unit 30b is equipped internally to adapt itself automatically to changes in the relative pressures of fluid in the two passages 92b, 120b so that the annular pressure chamber 132b for axially pressuring the port plate 98b is continuously supplied with fluid under a pressure equal to the higher of the two fluid pressures in the passages 92b, 120b.

Figure 16:
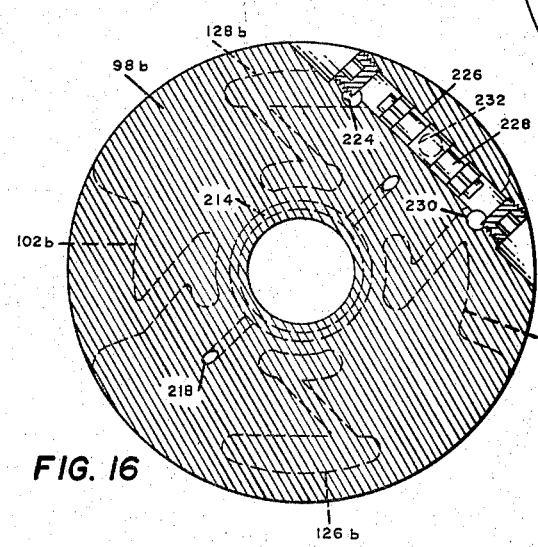
FIG. 16 is a transverse sectional view of the port plate taken with reference to the line 16—16 of FIG. 13 and showing the automatic reversing valve which adapts the unit automatically to changes in the relative pressures of fluid at the two fluid connections to the unit.

Having reference to FIGS. 13, 15 and 16, the porting 128b communicating with the passage 120b is connected through a bore 224 with one end of a chordal cylinder 226 formed in the port plate 98b and containing a longitudinally slidable valve spool 228. Similarly, the porting 100b formed in the port plate 98b and communicating with the flow passage 92b is connected through a bore 230 with the end of the cylinder 226 opposite from the bore 224, FIGS. 15 and 16. A fluid outlet bore 232, FIGS. 13 and 16, extends laterally from the center of the cylinder 226 to the annular high pressure chamber 132b.

The control spool 228 slides automatically under fluid pressure to the low pressure end of the cylinder 226 to direct fluid into the high pressure chamber 132b and hence to the radially inward sides of the vane actuating balls 202 of all the vane actuating assemblies 190 from either the porting 100b or the porting 128b depending upon which is under the higher pressure. It will be understood that the fluid pressure continuously applied and continuously acting to urge all the balls 202 outwardly is continuously equal to the higher of the fluid pressures existing in the two main passages 92b and 120b through which fluid from the external environment circulates through the unit. At the same time, the spaces in the counterbores 204 on the radially outward sides of the balls 202 are continuously connected, as described, to a suitable drain.

To assure prompt and reliable starting of the unit 30b when it is used as a motor, each of the vanes 54b is continuously urged outwardly by a pair of compression springs 240 seated in shallow radial bores 242 in the rotor 32b at the bottom of the corresponding vane slot and extending into counterbores 244 in the radially inner ends of radial bores 248 extending radially through each vane 54b. The bores 248 assist in providing continuous communication between the inner and outer edges of the vane so that forces of fluid pressure on the external edges of the vane are continuously balanced.

The unit 30c illustrated in FIGS. 19 to 24 is another modified embodiment of the invention. Component elements of the unit 30c, which form counterparts of the unit 30 previously described, are identified with the same reference numbers with the addition of the suffix c.

The rotor 32c, like the rotor 32b of the unit 30b previously described, is fashioned in one piece. Each vane slot 56c is defined on opposite sides thereof by two flat and parallel surfaces 250, 252 defined by the rotor and individually extending radially from the rotor periphery 48c substantially to the bottom of the corresponding slot, each of the slots 56c, as viewed in axial sections, being somewhat enlarged circumferentially and rounded adjacent the bottom of the slot to avoid concentrations of stress on the inner end portions of the intervening rotor sectors 170c.

Each of the vane slots 56c receives and generally contains a two-piece vane assembly 254. Each assembly 254 is constituted by a radially movable vane 54c, FIG. 23, and a comating insert 256, FIG. 22, disposed in mutually confronting relation to each other, FIG. 21.

As will appear hereinafter, each vane assembly 254 is designed to be fabricated independently of the rotor 32c and easily assembled into the rotor to function in conjunction with the simply constructed vane slot 56c receiving the assembly to continuously apply to the vane 54c of the assembly a differential outward force of fluid pressure while at the same time maintaining the vane virtually in a complete state of balance with respect to all the forces of fluid pressure applied to the vane, except for the desired differential force of fluid pressure which urges the vane outwardly.

The insert 256 and vane 54c of each assembly 254 are each flush at opposite ends with the two ends of the rotor 32c. The insert 256 is dimensioned radially to extend from the bottom of the coacting vane slot 56c into flush relation to the rotor periphery 48c. A laterally projecting anchoring toe 258 formed on the inner marginal edge of the insert 256 and extending along the axial length of the insert fits into the enlarged inner end of the coacting vane slot 56c to anchor the insert 256 against radially outward movement so that the insert is securely locked against radial displacement within the vane slot during operation of the unit.

The insert 256 and vane 54c of each assembly 254 are generally equal to each other in thickness, except as the thickness of these elements is varied by features to be described. Each insert 256 defines in its radial side confronting the associated vane 54c a recess 260 extending axially between the two axial ends of the insert. The recess 260 has a flat bottom surface 262 parallel to the adjacent vane 54c and parallel to the side surfaces 250, 252 defining the corresponding vane slot 56c.

Figure 21:
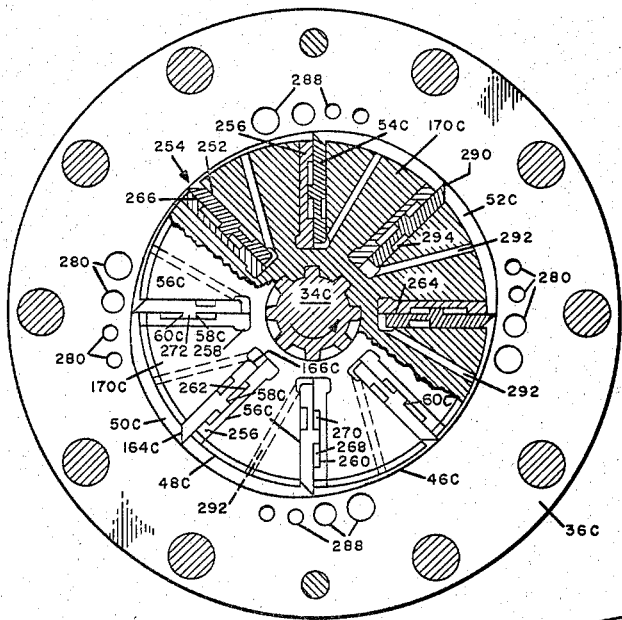
FIG. 21 is a transverse sectional view taken with reference to the line 21—21 of FIG. 19 with portions of the rotor and adjacent vane assemblies broken away for clearness in illustration.
Figure 22:
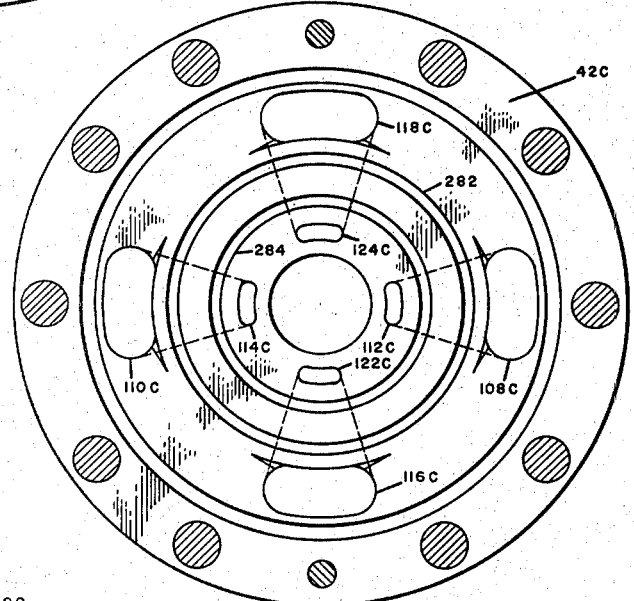
FIG. 22 is a transverse sectional view taken with reference to the line 22—22 of FIG. 19 and illustrating porting confronting one side of the rotor and cam assembly.

Two mutually coplanar flat surfaces 264, 266, FIGS. 21 and 22, formed on each insert 256 extend axially between opposite ends of the insert on the radially inward and radially outward sides of the intervening recess 260, slidably engage the generally flat adjacent vane 54c to form slidable seals with the vane extending between opposite ends of the rotor on the radially inward and radially outward sides of the insert recess 260.

The space defined by the flat bottomed recess 260 in each insert 256 and the opposing vane 54c is used to contain fluids under different pressures which apply a differential outward force of fluid pressure to the adjacent vane 54c, which is fashioned in relation to the coacting structure in such manner that the adjacent vane is continuously maintained free of unbalanced forces of fluid pressure except for the differential force of fluid pressure developed and used to continuously urge the vane outwardly.

The space defined by the recess 260 in each insert 256 and the coacting vane 54c is divided into a low pressure cavity 268 and a high pressure cavity 270 by means of a radially narrow, axially elongated projection 272 formed on the coacting vane 54c and projecting laterally into the adjacent insert recess 260. The projection 272 extends axially between opposite ends of the vane 54c and defines along its axial length a flat radial surface 274, FIG. 23, which slidably engages the flat bottom surface 262 of the recess 260 in the adjacent insert 256 to slidably support the vane and to effect a seal between the low pressure and high pressure cavities 268, 270 into which the recess 260 is divided by the shoulder 272.

As described, the low pressure and high pressure cavities 268, 270 of each assembly 254 are both open at opposite ends of the rotor 32c. Having reference to FIGS. 21 and 23, it will be observed that the axially elongated, laterally extending vane projection 274 defines along its radially inward and radially outward sides, respectively, a high pressure biasing surface 58c and a low pressure biasing surface 60c. The high pressure cavity 270 corresponding to the vane is defined in part by the high pressure biasing surface 58c and extends radially inward from the high pressure biasing surface to be contracted and expanded respectively as an incident to inward and outward movements of the vane. The low pressure cavity 268 is defined in part by the low pressure biasing surface 60c and extends radially outward from the low pressure biasing surface to be expanded and contracted respectively as an incident to inward and outward movements of the vane.

The unit 30c illustrated is designed to function primarily as a pump in which intake fluid is supplied to the intake passage 92c.

Figure 19:
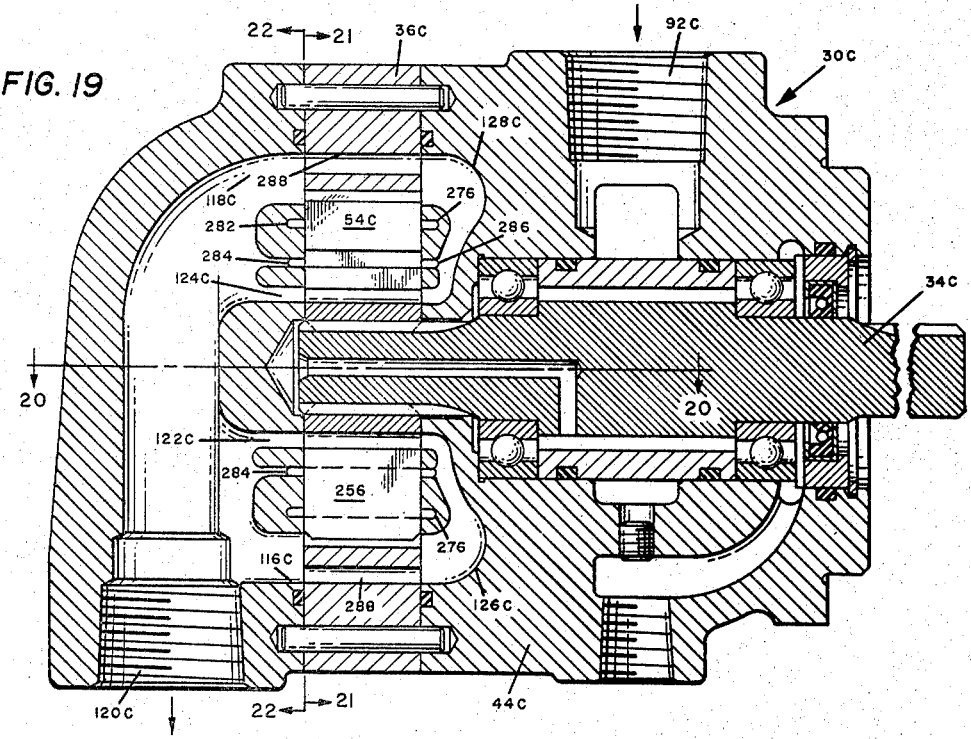
FIG. 19 is an axial sectional view of a modified unit forming another embodiment of the invention.
Figure 20:
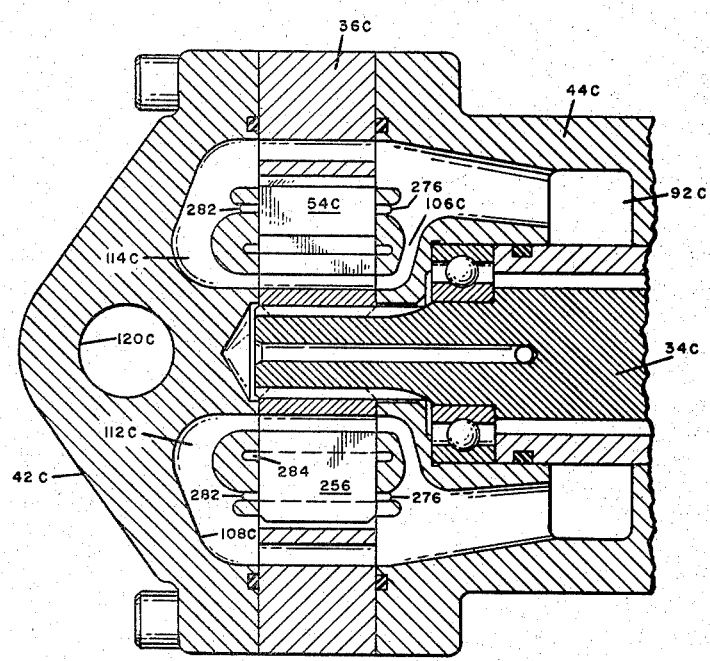
FIG. 20 is a fragmentary axial sectional view taken with reference to the line 20—20 of FIG. 19.

Having reference to FIGS. 19, 20 and 22, low pressure fluid under the intake pressure of the unit 30c is supplied to the axially extending low pressure chambers 268 of all the vane units 254 described. As illustrated, one axial end of each of the low pressure chambers 268 registers radially and communicates with an annular groove or fluid port 276 formed in the housing section 44c in confronting relation to the adjacent end of the rotor 32c. The annular groove or port 276 communicates with the intake passage 92c, as shown in FIG. 20, so that fluid under intake pressure is continuously supplied to all the chambers 268.

It may be noted with reference to FIGS. 20 and 21 that the intake passage 92c communicates through axial bores 280 with the porting 108c, 110c, 112c and 114c in the housing section 42c which feeds intake fluid from the opposite side of the rotor 32c. An annular groove or port 282 formed in the housing section 42c, FIGS. 20 and 22, and communicating with the intake porting 108c and 110c, as illustrated, registers radially and communicates with the axial ends of the low pressure chambers 268 opposite from the housing section 44c, the low pressure chambers 268 thus being connected to receive and discharge fluid at both ends.

The high pressure chambers 270 of all the assemblies 254 register radially and communicate with an annular groove or port 284 formed in the housing section 42c in confronting relation to the adjacent end of the rotor 32c, as shown in FIGS. 19, 20 and 22. The annular groove or port 284 communicates directly with the high pressure outlet passage 120c so that fluid under the high outlet pressure is supplied to pressure chambers 270 of all the assemblies 254.

The opposite ends of the high pressure chambers 270 register radially and communicate with an annular groove or port 286 formed in the housing section 44c and communicating with high pressure outlet porting 126c and 128c in the housing section 44c as shown in FIG. 19. Radial bores 288 formed in the cam 36c outwardly with the cam surface 46c connect the outlet porting 126c and 128c with the outlet passage 120c, as shown in FIG. 19.

Having reference to FIG. 21, it will be noted that the radially outward force of high pressure fluid acting on the shoulder 272 of each vane 54c is opposed by the force of fluid under a much lower pressure acting inwardly in the same shoulder 272 with the result that the differential fluid pressure acting on each vane shoulder 272 continuously exerts a net outward force on the corresponding vane 54c throughout its circular orbital path movement.

Figures 23, 24:
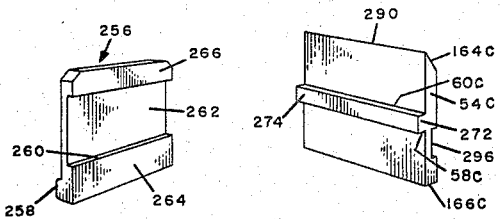
FIG. 23 is a perspective view on an enlarged scale of a typical vane used in the unit of FIG. 19.
FIG. 24 is a perspective view of a typical insert placed in a vane slot of the unit of FIG. 19 to coact with the typical vane of FIG. 23.

The inward force of fluid pressure acting inwardly on the outer external edge 164c of each vane 54c is neutralized continuously by the outward force of a similar fluid pressure acting outwardly on the inner external edge 166c of the vane, FIGS. 21 and 23. It will be noted that each vane 54c defines on its radially outer end only a single cam contacting edge 290 immediately contiguous to the radial face of the vane confronting the coacting insert 256. Fluid pressure corresponding to that applied to the outer external edge 164c of each vane 54c is continuously supplied to the inner external edge 166c of the vane by means of an oblique radial bore 292 extending from the bottom of each vane slot 56c to the periphery 48c of the rotor 32c adjacent the outer end of the corresponding vane 54c, as shown in FIG. 21.

It may be noted with reference to FIG. 21 that the high pressure fluid in the high pressure chamber 270 of each assembly 254 exerts a lateral pressure on the adjacent vane 54c urging it toward the adjacent side surface 252 of the corresponding vane slot 56c. This lateral force of high pressure fluid on the vane is opposed to the end that the vane is substantially balanced laterally by means of a countering force of fluid under high pressure admitted to a high pressure vane balancing chamber 294 formed on the side of each vane 54c opposite from the coacting insert 256 and in general radial alignment with the high pressure vane actuating chamber 270.

The high pressure vane balancing chamber 294 is formed by a recess 296 formed in the side of the vane 54c to extend axially between opposite ends of the vane in a radial position which radially overlaps the portion of the insert recess 262 which contains the high pressure vane actuating chamber 270.

Opposite ends of each high pressure vane balancing chamber 294 register radially and communicate continuously with the two previously described high pressure fluid supply grooves or ports 284, 286 confronting opposite ends of the rotor 32c.

It will be appreciated that assembly of the several vane assemblies 254 into the rotor 32c is achieved simply by moving the insert 256 and vane 54c of each assembly 254 axially into the corresponding vane slot 56c before the unit 30c is completely assembled.

The invention is claimed as follows:

1. A fluid power unit comprising, in combination, a rotor, housing means encasing said rotor and including an annular cam encircling said rotor and defining therewith fluid transfer space having an arcuate extent along the periphery of said rotor, said housing means defining first and second fluid flow passages communicating with said fluid transfer space at opposite ends of the latter, said rotor defining a plurality of circumferentially spaced radial slots extending outwardly through the periphery thereof, each of said slots being defined on opposite sides thereof by two flat and parallel surfaces defined by the rotor and individually extending radially from the periphery of the rotor substantially to the bottom of the slot; each of said slots, as viewed in axial section, being somewhat enlarged circumferentially and rounded adjacent the bottom of the slot to avoid concentrations of stress on the inner end portions of adjacent sectors of the rotor intervening between the slots; a fluid operated vane assembly disposed in each of said slots, each vane assembly including a radially movable vane and a comating insert disposed in mutually confronting slidable relation to each other, the slidable vane and the coacting insert of each assembly each extending axially between opposite ends of said rotor and having at opposite ends radial edges that are substantially flush with the respective ends of the rotor, each insert defining on the radially inner portion thereof an enlargement fitting into the enlarged inner portion of the coacting vane slot to anchor the insert against radial movement, each insert defining in the side thereof confronting the associated vane a recess extending axially between the opposite radial edges of the insert and having a flat bottom parallel to the adjacent vane, each insert defining two flat coplanar surfaces slidably engaging the adjacent vane to form slidable seals therewith extending axially between opposite ends of the insert at the radially inward and radially outward sides respectively of said recess, each vane defining thereon an axially elongated projection extending axially between opposite ends of the vane and projecting laterally along the full axial length of the vane to define along the radially inward and radially outward sides respectively of said projection a high pressure vane biasing surface and a low pressure vane biasing surface, said axially elongated projection on each vane slidably engaging said flat bottom of the recess in the adjacent insert to slidably support the vane and to divide the recess into a high pressure cavity for high pressure fluid and a low pressure cavity for low pressure fluid, said high pressure cavity for each vane being defined in part by said high pressure biasing surface on the vane and extending radially inward from said high pressure biasing surface so that said high pressure cavity is contracted and expanded respectively as an incident to inward and outer movements of the vane, said low pressure cavity for each vane being defined in part by said low pressure biasing surface on the vane and extending radially outward from said low pressure biasing surface so that said low pressure cavity is expanded and contracted respectively as an incident to inward and outward movements of the vane, each vane defining in the side thereof opposite from the adjacent insert a recess extending axially between the opposite radial edges of the vane and being generally aligned radially with said high pressure cavity on the opposite side of the vane so that said vane recess coacts with the adjacent slot defining rotor surface to form a counterbalancing chamber juxtaposed radially with said high pressure cavity, said housing means including a fluid pressure actuated cheek plate confronting said rotor at one end thereof and defining a high pressure fluid supply port of annular form registering radially with said counterbalancing chambers and with said high pressure cavities to supply fluid continuously under high pressure to said counterbalancing chambers and said high pressure cavities for all said vanes simultaneously, said cheek plate defining a low pressure fluid passage port of annular form registering radially with said low pressure cavities for all said vanes to provide continuously a low fluid pressure in all said low pressure cavities, and said rotor and said vane assemblies including means providing fluid pressure equalizing passages between the inner ends of the respective vane slots and the outer ends of the respective vanes.

2. A rotary vane fluid power unit comprising, in combination, a rotor, housing means encasing said rotor and including a cam encircling said rotor and defining therewith fluid transfer space having an arcuate extent along the periphery of said rotor, said housing means defining first and second fluid flow passages communicating with said fluid transfer space at opposite ends of the latter, said rotor defining a plurality of circumferentially spaced vane slots, a vane assembly disposed in each of said slots and including an insert disposed in a predetermined position in the rotor and a radially movable vane slidably engaging the insert, each insert and each vane extending axially between the adjacent opposite ends of said rotor, each insert defining in the vane side thereof a recess extending axially between opposite ends of the insert and having a flat bottom parallel to the adjacent vane, each vane slidably engaging the adjacent insert to form therewith slidable seals extending axially between opposite ends of the insert at the radially inward and radially outward sides of said recess, each vane defining thereon an axially elongated projection extending axially between opposite ends of the vane and projecting laterally along the full axial length of the vane to define along the radially inward and radially outward sides respectively of said projection a high pressure vane biasing surface and a low pressure vane biasing surface, said axially elongated projection on each vane slidably engaging said flat bottom of the recess in the adjacent insert to slidably support the vane and to divide the recess into a high pressure cavity for high pressure fluid and a low pressure cavity for low pressure fluid, said high pressure cavity for each vane being defined in part by said high pressure biasing surface on the vane and extending radially inward from said high pressure biasing surface so that said high pressure cavity is contracted and expanded respectively as an incident to inward and outward movements of the vane, said low pressure cavity for each vane being defined in part by said low pressure biasing surface on the vane and extending radially outward from said low pressure biasing surface so that said low pressure cavity is expanded and contracted respectively as an incident to inward and outward movements of the vane, each vane defining in the side thereof opposite from the adjacent insert a recess extending axially between opposite ends of the vane and being generally aligned radially with said high pressure cavity on the insert side of the vane so that said vane recess coacts with the adjacent portion of the rotor to form a counterbalancing chamber juxtaposed radially with said high pressure cavity, said housing means defining a high pressure fluid supply port registering with said counterbalancing chambers and with said high pressure cavities to supply fluid continuously under high pressure to both said counterbalancing chambers and said high pressure cavities, said housing means defining a low pressure fluid passage communicating with said low pressure cavities to provide a fluid pressure in the latter that is continuously relatively low in relation to the fluid pressure in said high pressure cavities; and said rotor having rotatable therewith pressure equalizing passages isolated from direct communication with said counterbalancing chambers, said high pressure cavities, and said low pressure cavities and connecting the inner ends of said respective vane slots with the radially outer ends of the corresponding vanes.

3. A rotary vane fluid power unit comprising, in combination, a rotor, housing means encasing said rotor and defining a cam surface encircling said rotor and defining therewith fluid transfer space having an arcuate extent along the periphery of said rotor, said housing means defining first and second fluid flow passages communicating with said fluid transfer space at opposite ends of the latter to circulate fluid therethrough, said rotor defining a plurality of circumferentially spaced vane slits, a vane slidably disposed in each of said slots to continuously engage said cam surface, said rotor having thereon means associated with each vane slot and confronting one radial side of the adjacent vane to define therewith a recess located axially inward of the outer periphery of the rotor and having a flat bottom confronting the adjacent vane in parallel relation thereto, each vane defining thereon a axially elongated projection projecting laterally to define along the radially inward and radially outward sides respectively of said projection a high pressure vane biasing surface and a low pressure vane biasing surface, said axially elongated projection on each vane slidably engaging said flat bottom surface of the adjacent recess and extending along the full axial extent of the recess to slidably support the vane and to divide the recess into a high pressure cavity for high pressure fluid and a low pressure cavity for low pressure fluid, said high pressure cavity and said low pressure cavity for each vane being defined respectively in part by said high pressure biasing surface and said low pressure biasing surface on the vane and extending respectively radially inward and radially outward from said respective biasing surfaces, said housing means containing means defining a high pressure fluid supply passage communicating with said high pressure cavities of all said vanes to supply fluid continuously thereto under high pressure and defining a low pressure fluid passage communicating with said low pressure cavities of all said vanes to provide continuously therein a fluid pressure that is relatively low in relation to the fluid pressure in said high pressure cavities so that each vane is urged outwardly by the force of differential fluid pressure on said high pressure and said low pressure biasing surfaces on the vane, and said rotor having rotatable therewith pressure equalizing passages isolated from direct communication with said high pressure cavities and said low pressure cavities and connecting the inner ends of the respective vane slots with the radially outer ends of the corresponding vanes.

4. A low pressure fluid power unit according to claim 3 in which each vane defines in the radial side thereof facing away from the adjacent high pressure and low pressure cavities a vane recess coacting with the adjacent portion of the rotor to form a counterbalancing chamber generally aligned radially with the high pressure cavity on the opposite side of the vane and communicating with said high pressure fluid supply passage so that the force of fluid under high pressure in the counterbalancing chamber acts laterally on the vane to oppose the lateral force on the vane of high pressure fluid in said high pressure cavity on the opposite side of the vane.

5. A rotary vane fluid power unit comprising, in combination, a rotor, housing means encasing said rotor and defining a cam surface encircling said rotor and defining therewith fluid transfer space having an arcuate extent along the periphery of the rotor, said housing means defining first and second fluid passages communicating with said fluid transfer space at opposite ends thereof to circulate fluid therethrough, said rotor defining a series of circumferentially spaced vane slots opening outwardly through the periphery of the rotor, a plurality of vanes slidably supported in said respective vane slots to continuously engage said cam surface, said rotor and said vanes defining an enclosed low pressure fluid chamber of annular form substantially concentric with the axis of the rotor, said rotor and said vanes defining an enclosed high pressure fluid chamber of annular form radially spaced inwardly of the periphery of the rotor and encircling said low pressure chamber in radially spaced relation to the low pressure chamber; for the purpose of containing adjacent portions of said high pressure and said low pressure chambers, each of said vanes defining a central aperture positioned in the vane to register both radially and axially with both said high pressure and low pressure annular chambers for all operating positions of the vane so that both said chambers extend continuously through said apertures of all the vanes; said aperture in each vane being defined and bounded in part by two radial inner edges formed on the vane in parallel, axially spaced relation to each other; a plurality of partition and reaction members disposed in said central apertures of said respective vanes and being located radially between said low pressure chamber and said high pressure chamber, each of said partition and reaction members being sealed with said rotor on opposite sides of the corresponding vane slot and having slidable sealing engagement with both of said radial inner edges of the vane so that the partition and reaction member coacts with the corresponding vane and adjacent portions of the rotor to form an effective barrier to the passage of fluid between adjacent portions of said low pressure chamber and said high pressure chamber, each vane defining thereon at the radially outward side of the vane aperture a high pressure biasing surface against which high fluid pressure in said high pressure chamber acts to urge the vane outwardly, each vane defining thereon at the radially inward side of the vane aperture a low pressure biasing surface against which low fluid pressure in said low pressure chamber acts to urge the vane inwardly, each of said vanes defining in the radial edges thereof at opposite ends of the vane radial grooves providing continuous communication for the passage of fluid between the radially inner edge and the radially outer edge of the vane for equalizing the fluid pressures acting in opposite directions on said radially inner and outer edges of the vane, said rotor defining a high pressure fluid passage communicating with said high fluid pressure chamber in the rotor and extending axially to one end of the rotor, said housing means defining a fluid supply port connected with the high pressure end of said fluid working space and confronting said rotor in radial alignment with the adjacent end of said high pressure fluid passage in the rotor to supply vane actuating fluid therethrough under high pressure to said high pressure fluid chamber in the rotor, and a source of low fluid pressure communicating with said low pressure fluid chamber in said rotor to maintain continuously in said low pressure chamber a fluid pressure that is relatively low in relation to the fluid pressure in said high pressure fluid chamber.

6. A rotary vane fluid power unit comprising, in combination, a rotor, housing means encasing said rotor and defining a cam surface encircling said rotor and defining therewith fluid transfer space having an arcuate extent along the periphery of the rotor, said housing means defining first and second fluid passages communicating with said fluid transfer space at opposite ends thereof to circulate fluid therethrough, said rotor defining a series of circumferentially spaced vane slots opening outwardly through the periphery of the rotor, a plurality of vanes slidably supported in said respective vane slots to continuously engage said cam surface, said rotor and said vanes defining an enclosed low pressure fluid chamber of annular form substantially concentric with the axis of the rotor, said rotor and said vanes defining an enclosed high pressure fluid chamber of annular form radially spaced inwardly of the periphery of the rotor and encircling said low pressure chamber in radially spaced relation to the low pressure chamber; for the purpose of containing adjacent portions of said high pressure and said low pressure chambers, each of said vanes defining a central aperture positioned in the vane to register both radially and axially with both said high pressure and low pressure annular chambers for all operating positions of the vane so that both said chambers extend continuously through said apertures of all the vanes; said aperture in each vane being defined and bounded in part by two radial inner edges formed on the vane in parallel, axially spaced relation to each other; a partition and reaction member disposed in said central aperture of each vane and being located radially between said low pressure chamber and said high pressure chamber, each partition and reaction member coacting with said rotor to hold the partition and reaction member against inward displacement, each partition and reaction member having a fluid sealing relationship to said rotor on opposite sides of the corresponding vane slot and having slidable sealing engagement with both of said radial inner edges of the vane so that the partition and reaction member coacts with the corresponding vane and adjacent portions of the rotor to form an effective barrier to the passage of fluid between adjacent portions of said low pressure chamber and said high pressure chamber, each vane defining at the radially outward side of the vane aperture a high pressure vane biasing surface against which high fluid pressure in said high pressure chamber acts to urge the vane outwardly, each vane defining at the radially inward side of the vane aperture a low pressure vane biasing surface against which low fluid pressure in said low pressure chamber acts to urge the vane inwardly, said rotor defining a high pressure rotor passage communicating with said high fluid pressure chamber within the rotor and opening through the surface of the rotor, said rotor defining a low pressure rotor passage communicating with said low pressure fluid chamber within said rotor and opening through the surface of the rotor, and said housing means encasing a high pressure fluid passage and a low pressure fluid passage communicating respectively with high pressure rotor passage and said low pressure rotor passage for providing continuously in said high pressure chamber and in said low pressure chamber fluid pressures that are relatively high and relatively low in relation to each other so that each vane is continuously urged outwardly by the differential force of fluid pressures on said high pressure vane biasing surface and said low pressure vane biasing surface on each vane.

7. A rotary vane fluid power unit according to claim 6 in which the rotor is formed in two annular sections fitted and secured together in mutually concentric relation.

8. A rotary vane fluid power unit according to claim 6 in which each partition and reaction member is cylindrical in form, fits in seat recesses in the rotor on opposite sides of the corresponding vane slot, and has flat ends fitting slidably against the internal radial edges of the vane.

9. A rotary vane fluid power unit according to claim 6 in which each partition and reaction member comprises a reaction column engaging the bottom of the adjacent vane slot and extending radially outward through the inner portion of the adjacent vane into the central aperture therein, each partition and reaction member includes a partition element extending axially from the outer end of the corresponding reaction column and being located radially between the high pressure and low pressure annular chambers, each of said partition elements has slidable sealing engagement with the two radial inner edges of the vane, and portions of each vane located radially inward of the central aperture in the vane have slidable fluid sealing engagement with the adjacent reaction column and define said low pressure biasing surface on the vane against which low pressure fluid in said low pressure chamber acts to urge the vane inwardly.

10. A rotary vane fluid power unit comprising, in combination, a rotor, housing means encasing said rotor and having thereon a cam surface encircling said rotor and defining therewith fluid transfer space having an arcuate extent along the periphery of the rotor, said housing means defining first and second fluid passages communicating with said fluid transfer space at opposite ends thereof to pass fluid therethrough, said rotor defining therein a series of circumferentially spaced generally radial vane slots opening outwardly through the periphery of the rotor, a plurality of generally radial vanes slidably supported in said respective vane slots to continuously engage said cam surface, each vane defining on the radially outward edge thereof and in confronting relation to the adjacent cam surface an outer edge surface against which ambient fluid pressure prevailing between said outer edge surface and said cam surface acts to urge the vane inwardly, each vane defining on the radially inward edge thereof and in confronting relation to the inner portion of the corresponding vane slot an inner edge surface against which fluid pressure in the inner portion of the corresponding vane slot acts to urge the vane outwardly, said rotor having rotatable therewith pressure equalizing passages corresponding to said respective vanes each pressure equalizing passage communicating continuously with the outer edge surface and with the inner edge surface of the corresponding vane for reducing differences in fluid pressures on said inner and outer edge surfaces of the vane so that the radial forces of fluid pressure on said inner and outer edge surfaces are maintained in a generally balanced state, each vane defining thereon a high pressure biasing surface radially located on the vane between said outer edge surface and said inner edge surface on the vane and oriented so that fluid pressure applied to said high pressure biasing surface urges the vane radially outward, each vane defining thereon a low pressure biasing surface radially positioned between said outer edge surface and said inner edge surface on the vane and oriented so that fluid pressure applied to said low pressure biasing surface urges the vane radially inward, said rotor having means thereon coacting with each vane to form therewith and with respect thereto a high pressure cavity defined in part by said high pressure biasing surface on the vane on and extending radially inward from said high pressure biasing surface so that said high pressure cavity is contracted and expanded as an incident to movement of the vane in radially inward and radially outward directions respectively, said rotor having means thereon coacting with each vane to form therewith and with respect thereto a low pressure cavity isolated from said high pressure cavities for the respective vanes and from the fluid pressure in said high pressure cavities, said low pressure cavity for each vane being defined in part by said low pressure biasing surface on the vane and extending radially outward from said low pressure biasing surface so that said low pressure cavity is expanded and contracted as an incident to radial movement of the vane in radially inward and radially outward directions respectively, said high pressure cavities and said low pressure cavities being isolated by the means defining said high and low pressure cavities from said inner and outer edge surfaces of the vanes so that the fluid pressures in said high and low pressure cavities can be controlled independently of the fluctuations of fluid pressure on the inner and outer edge surfaces of the vanes, and said housing means encasing high pressure fluid passage means communicating with all of said high pressure fluid cavities for said respective vanes and said housing means encasing low pressure fluid passage means communicating with all said low pressure cavities for said respective vanes for continuously maintaining in said high pressure fluid cavity and in said low pressure fluid cavity for each vane fluid pressures that are relatively high and relatively low in relation to each other.

11. A rotary vane fluid power unit comprising, in combination, a rotor, housing means encasing said rotor and having thereon a cam surface encircing said rotor and defining therewith fluid transfer space having an arcuate extent along the periphery of the rotor, said housing means defining first and second fluid passages communicating with said fluid transfer space at opposite ends thereof to pass fluid therethrough, said rotor defining therein a series of circumferentially spaced generally radial vane slots opening outwardly through the periphery of the rotor, a plurality of generally radial vanes slidably supported in said respective vane slots to continuously engage said cam surface, each vane defining on its own integral structure four separate pressure surfaces on which fluid pressure acts to urge the vane radially, the first one of said four pressure surfaces on each vane being formed on the radially outward edge of the vane in confronting relation to the adjacent cam surface to urge the vane inwardly by the force exerted on said first pressure surface by the fluid pressure between the outer end of the vane and said cam surface, the second one of said four pressure surfaces on each vane being formed on a radially inward edge of the vane in confronting relation to the inner portion of the corresponding vane slot to urge the vane outwardly by the force exerted on said second pressure surface by the fluid pressure in the inner portion of the corresponding vane slot, said rotor having rotatable therewith pressure equalizing passages corresponding to said respective vanes, each pressure equalizing passage communicating continuously with said first and second pressure surfaces on the corresponding vane for reducing differences in fluid pressures thereon so that the radial forces of fluid pressure on said first and second pressure surfaces on each vane generally offset each other continuously, the third one of said four pressure surfaces on each vane constituting a high pressure biasing surface oriented so that fluid pressure applied thereto urges the vane radially outward, said rotor having means thereon coacting with each vane to form therewith and with respect thereto a high pressure cavity defined in part by said high pressure biasing surface on the vane on and extending radially inward from said high pressure biasing surface so that said high pressure cavity is contracted and expanded as an incident to movement of the vane in radially inward and radially outward directions respectively, the fourth one of said four pressure surfaces on each vane constituting a low pressure biasing surface oriented so that fluid pressure applied thereto urges the vane radially inward, said rotor having means thereon coacting with each vane to form therewith and with respect thereto a low pressure cavity isolated from said high pressure cavities for the respective vanes and from the fluid pressure in said high pressure cavities, said low pressure cavity for each vane being defined in part by said low pressure biasing surface on the vane and extending radially outward from said low pressure biasing surface so that said low pressure cavity is expanded and contracted as an incident to radial movement of the vane in radially inward and radially outward directions respectively, said high pressure cavities and said low pressure cavities being isolated by the means defining said high and low pressure cavities from said first and second pressure surfaces on the respective vanes so that the fluid pressures in said high and low pressure cavities can be controlled independently of the fluctuations of fluid pressure on said first and second pressure surfaces of the vanes, and said housing means encasing high pressure fluid passage means communicating with all of said high pressure fluid cavities for said respective vanes and said housing means encasing low pressure fluid passage means communicating with all said low pressure cavities for said respective vanes for continuously maintaining in said high pressure fluid cavity and in said low pressure fluid cavity for each vane fluid pressures that are relatively high and relatively low in relation to each other so that the vane is continuously urged outwardly by the differential force of fluid pressures on said third and fourth pressure surfaces on the vane.

12. A rotary vane fluid power unit comprising, in combation, a rotor, housing means encasing said rotor and having thereon a cam surface encircling said rotor and defining therewith fluid transfer space having an arcuate extent along the periphery of the rotor, said housing means defining first and second fluid passages communicating with said fluid transfer space at opposite ends thereof to pass fluid therethrough, said rotor defining therein a series of circumferentially spaced generally radial vane slots opening outwardly through the periphery of the rotor, a plurality of generally radial vanes slidably supported in said respective vane slots to continuously engage said cam surface, each vane defining on its own integral structure four separate pressure surfaces on which fluid pressure acts to urge the vane radially, the first one of said four pressure surfaces on each vane being formed on the radially outward edge of the vane in confronting relation to the adjacent cam surface to urge the vane inwardly by the force exerted on said first pressure surface by the fluid pressure between the outer end of the vane and said cam surface, the second one of said four pressure surfaces on each vane being formed on a radially inward edge of the vane in confronting relation to the inner portion of the corresponding vane slot to urge the vane outwardly by the force exerted on said second pressure surface by the fluid pressure in the inner portion of the corresponding vane slot, said rotor having rotatable therewith pressure equalizing passages corresponding to said respective vanes, each pressure equalizing passage communicating continuously with said first and second pressure surfaces on the corresponding vane for reducing differences in fluid pressures thereon so that the radial forces of fluid pressure on said first and second pressure surfaces on each vane generally offset each other continuously, the third one of said four pressure surfaces on each vane constituting a high pressure biasing surface oriented so that fluid pressure applied thereto urges the vane radially outward, the fourth one of said four pressure surfaces on each vane constituting a low pressure biasing surface oriented so that fluid pressure applied thereto urges the vane radially inward, said rotor including means coacting with said vanes to isolate said third and fourth pressure surfaces on each vane from each other and from both said first and second pressure surfaces on the vane and to supply continuously to said third and fourth pressure surfaces respectively of each vane fluid pressures that are relatively high and relatively low in relation to each other so that the vane is continuously urged outwardly by the differential force of fluid pressures on said third and fourth pressure surfaces on the vane.

13. A rotary vane fluid power unit comprising, in combination, a rotor, housing means encasing said rotor, said rotor defining therein an annular series of vane slots opening outwardly in generally radial directions, a plurality of vanes slidably supported in said respective vane slots, each vane defining on its own integral structure four separate pressure surfaces on which fluid pressure acts to urge the vane radially, the first one of said four pressure surfaces on each vane being formed on the radially outward edge of the vane to urge the vane inwardly by the force of ambient fluid pressure on said first pressure surface, the second one of said four pressure surfaces on each vane being formed on the vane radially inward of said outward edge of the vane to urge the vane outwardly by the force of fluid pressure on said second pressure surface, said rotor having rotatable therewith balancing fluid passages communicating continuously with said second pressure surfaces on the respective vanes for supplying thereto variable fluid pressures for off-setting the inward forces on the respective vanes of the variable fluid pressure on said first pressure surfaces thereon, the third one of said four pressure surfaces on each vane constituting a high pressure biasing surface oriented so that fluid pressure applied thereto urges the vane radially outward, the fourth one of said four pressure surfaces on each vane constituting a low pressure biasing surface oriented so that fluid pressure applied therto urges the vane radially inward, said rotor including means coacting with said vanes to isolate said third and fourth pressure surfaces on each vane from each other and from both said first and second pressure surfaces on the vane and to supply continuously to said third and fourth pressure surfaces respectively of each vane fluid pressures that are relatively high and relatively low in relation to each other so that the vane is continuously urged outwardly by the differential force of fluid pressures on said third and fourth pressure surfaces on the vane.

14. A rotary vane fluid power unit comprising, in combination, a rotor, housing means encasing said rotor and having thereon a cam surface encircling said rotor and defining therewith fluid transfer space having an arcuate extent along the periphery of the rotor, said housing means defining first and second fluid passages communicating with said fluid transfer space at opposite ends thereof to pass fluid therethrough, said rotor defining therein a series of circumferentially spaced vane slots opening outwardly through the periphery of the rotor, a plurality of vanes slidably supported in said respective vane slots to continuously engage said cam surface, each vane defining on its own integral structure four separate pressure surfaces on which fluid pressure acts to urge the vane radially, the first one of said four pressure surfaces on each vane being formed on the radially outward edge of the vane in confronting relation to the adjacent cam surface to urge the vane inwardly by the force exerted on said first pressure surface by the fluid pressure between the outer end of the vane and said cam surface, the second one of said four pressure surfaces on each vane being formed on the vane inwardly of the outer edge thereof and being oriented to urge the vane outwardly by the force of fluid pressure on said second pressure surface, said rotor having rotatable therewith pressure equalizing passages corresponding to said respective vanes, each pressure equalizing passage communicating continuously with said first and second pressure surfaces on the corresponding vane for reducing differences in fluid pressures thereon so that the radial forces of fluid pressure on said first and second pressure surfaces on each vane work against each other continuously, the third one of said four pressure surfaces on each vane constituting a high pressure biasing surface oriented so that fluid pressure applied thereto urges the vane radially outward, the fourth one of said four pressure surfaces on each vane constituting a low pressure biasing surface oriented so that fluid pressure applied thereto urges the vane radially inward, a plurality of inserts supported by said rotor in proximity to said respective vanes and coacting with the vanes to define with respect to each vane a high pressure cavity and a low pressure cavity isolated from each other and isolated from said first and second pressure surfaces on the vane, said high pressure cavity and said low pressure cavity for each vane being defined in part respectively by said high pressure biasing surface and said low pressure biasing surface on the vane and extending respectively radially inward and radially outward from said high pressure and low pressure biasing surfaces, and said housing means encasing a high pressure vane biasing pressure passage connecting all of said high pressure fluid cavities for said respective vanes with the one of said first and second passages that is under the higher fluid pressure, and said housing means encasing a low pressure vane biasing pressure passage connecting all said low pressure cavities for said respective vanes with the one of said first and second passages that is under the lower fluid pressure for continuously maintaining in said high pressure fluid cavity and in said low pressure fluid cavity for each vane fluid pressures that are relatively high and relatively low in relation to each other so that the vane is continuously urged outwardly by the differential force of fluid pressures on said third and fourth pressure surfaces on the vane.

15. A rotary vane fluid power unit comprising, in combination, a rotor, housing means encasing said rotor, said rotor defining therein an annular series of vane slots opening outwardly in generally radial directions, a plurality of vane assemblies corresponding to said respective vane slots and including respectively vanes slidably supported in said respective vane slots, said vane of each vane assembly defining on its own integral structure four separate pressure surfaces on which fluid pressure acts to urge the vane radially, the first one of said four pressure surfaces on the vane of each assembly comprising the entire radially outward surface of the vane, the second one of said four pressure surfaces on the vane of each assembly being formed on the vane radially inward of said outward surface of the vane, fluid passages interconnecting said second pressure surfaces on the vanes of the respective vane assemblies and said first pressure surfaces on the same respective vanes, the third one of said four pressure surfaces on the vane of each assembly constituting a high pressure biasing surface, the fourth one of said four pressure surfaces on the vane of each assembly constituting a low pressure biasing surface, and said rotor including means coacting with said vane assemblies to isolate said third and fourth pressure surfaces on the vane of each assembly from each other and from both said first and second pressure surfaces on the vane and to supply continuously to said third and fourth pressure surfaces respectively on the vane of each assembly fluid pressures that are relatively high and relatively low in relation to each other so that the vane of each assembly is continuously urged outwardly by the differential force of fluid pressures on said third and fourth pressure surfaces on the vanes.

16. A rotary vane fluid power unit comprising, in combination, a rotor, housing means encasing said rotor, said rotor defining therein an annular series of vane slots opening outwardly in generally radial directions, a plurality of vane assemblies corresponding to said respective vane slots and including respectively vanes slidably supported in said respective vane slots, said vane of each vane assembly defining on its own integral structure four separate pressure surfaces on which fluid pressure acts to urge the vane radially, the first one of said four pressure surfaces on the vane of each assembly comprising the entire radially outward surface of the vane, the second one of said four pressure surfaces on the vane of each assembly being formed on the vane radially inward of said outward surface of the vane, fluid passages interconnecting said second pressure surfaces on the vanes of the respective vane assemblies and said first pressure surfaces on the same respective vanes, the third one of said four pressure surfaces on the vane of each assembly constituting a high force biasing surface, the fourth one of said four pressure surfaces on the vane of each assembly constituting a low force biasing surface, and said rotor including means coacting with said vane assemblies to isolate said third and fourth pressure surfaces on the vane of each assembly from each other and from both said first and second pressure surfaces on the vane, said rotor including means for supplying to said high force biasing surface on the vane of each assembly a vane extending fluid pressure that acts continuously to bias the vane radially outwardly by a third force equal to the product of the vane extending fluid pressure, and the effective area of the high force biasing surface on the vane, and said rotor including means for supplying to said low force biasing surface on the vane of each assembly a vane retracting fluid pressure that acts continuously to bias the vane radially inwardly by a fourth force that is equal to the product of the vane retracting fluid pressure and the effective area of the low force biasing surface on the vane and that is continuously less than said third force biasing the vane outwardly so that the vane is continuously urged outwardly by the differential force on the vane resulting from said third force being continuously larger than said fourth force on the vane.

References Cited

UNITED STATES PATENTS

| 3,359,914 | 12/1967 | Adams et al. | 103—136 |
| 3,076,414 | 2/1963 | Adams | 91—138 X |
| 3,102,494 | 9/1963 | Adams | 91—137 X |
| 3,223,044 | 12/1965 | Adams et al. | 91—138 X |
| 3,279,325 | 10/1966 | Graubins | 91—137 |
| 3,329,067 | 7/1967 | Rosaen | 91—138 |

EVERETTE A. POWELL, JR., *Primary Examiner.*

U.S. Cl. X.R.

103—136